July 28, 1964     J. T. MANGUM     3,142,139
DRILL COLLAR FACING TOOL
Filed Nov. 16, 1962     2 Sheets-Sheet 1
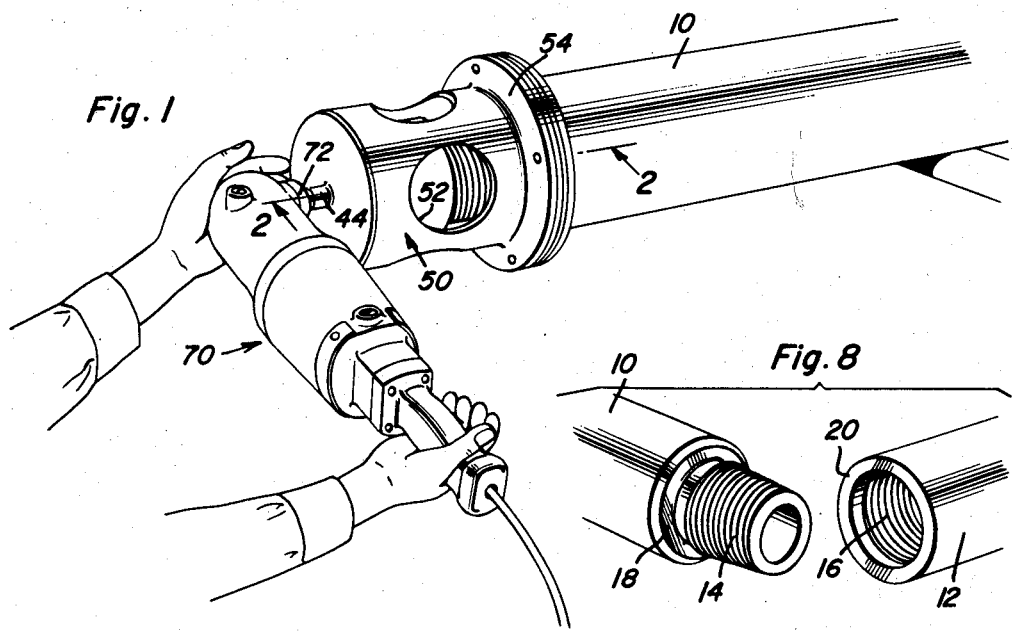
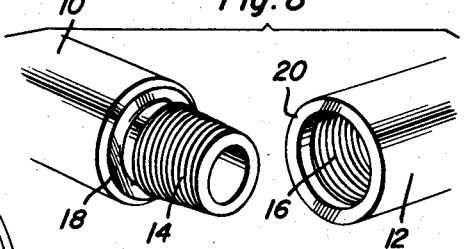
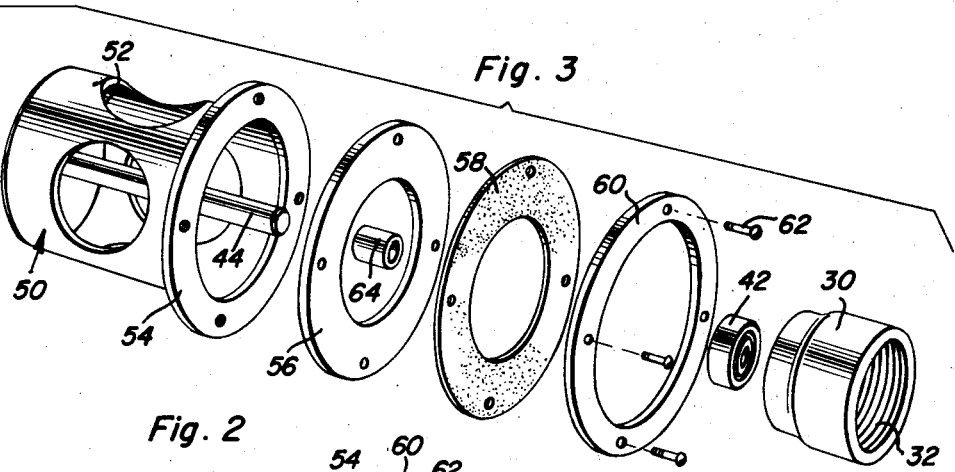
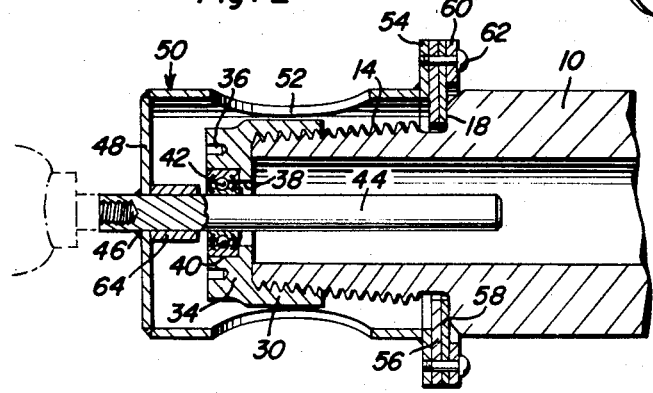
Joe T. Mangum
INVENTOR.

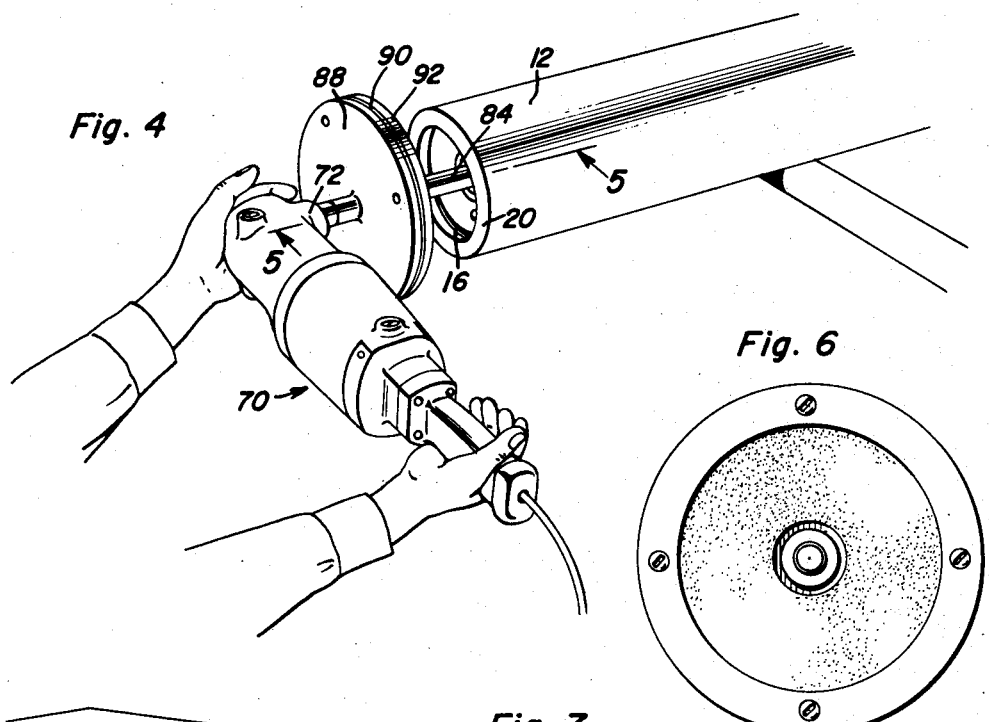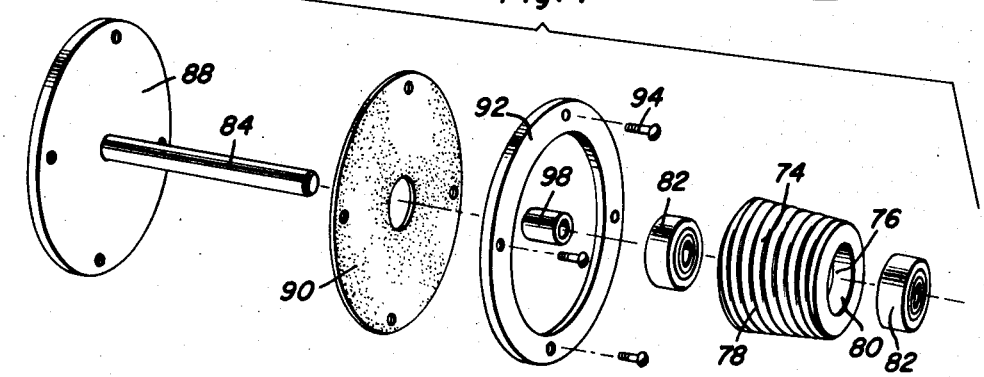

United States Patent Office 3,142,139
Patented July 28, 1964

3,142,139
DRILL COLLAR FACING TOOL
Joe T. Mangum, 709 Zuni Drive, Farmington, N. Mex.
Filed Nov. 16, 1962, Ser. No. 238,136
12 Claims. (Cl. 51—241)

This invention comprises a novel and useful drill collar facing tool and more particularly pertains to a tool especially adapted to refinish the mating surfaces of drill collars or other tool joints and provide a precise seating arrangement therebetween.

In various types of drill collar or other tool joints and especially of the type employed in the drilling or tubing strings of oil wells and the like the joints are usually formed by a pair of joint sections having cooperating male and female tapered threads. The shoulder portions of the sections at the ends of these threads are adapted and intended to have a face to face seating and abutting engagement with each other thereby limiting further engagement of the threads. However, as the tapered cooperating threads become worn, it is necessary to move the joints axially towards each other in order to take up for the wear between the threads and thus secure interengagement of the threads. However, such necessary further axial movement is prevented by the abutting engagement of the mating surfaces of the shoulder portions of the joint sections.

When this condition arises, it has been customary to machine or otherwise reface the annular mating surfaces of the joint sections in order to cut-away sufficient material to enable the joint sections to be further axially engaged with each other. Heretofore, it has been necessary to take the joint sections to a machine shop, and to rotate the joints during the machining or refinishing operation. This obviously requires a considerable amount of time and delay in the use of the joint sections which is especially undesirable in the case of a well drilling or servicing operation.

Moreover, the mounting of the joint sections to effect the necessary rotation for the machining or finishing operation is usually time and labor consuming and usually requires heavy duty equipment for this purpose.

It is therefore the primary purpose of this invention to provide an apparatus which will enable tool joints to be readily refaced in an inexpensive rapid and convenient manner obviating the above mentioned difficulties and disadvantages of prior practices and which will ensue the forming of the refaced mating surfaces with precision.

A further object of the invention is to provide an apparatus in accordance with the foregoing objects which can be quickly and easily readily applied to either the female or male joint sections for effectively and precisely refinishing the annular mating seating surface thereof.

A further and more specific object of the invention is to provide an apparatus in accordance with the preceding objects wherein the refacing tool shall itself be fixedly secured to and carried by the joint sections being refinished in a secure manner and one in which there is the necessary precise relation of the cutting element of the tool with respect to the surface of the joint being refaced.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the manner of utilizing the joint facing tool of this invention in connection with an externally threaded male joint section;

FIGURE 2 is a detailed view taken upon a somewhat enlarged scale in vertical longitudinal section substantially upon the plane indicated by the section line 2—2 of FIGURE 1;

FIGURE 3 is an exploded perspective view of the apparatus of FIGURES 1 and 2 but with the power operating means removed therefrom;

FIGURE 4 is a perspective view of the tool required for the refacing of the mating surface of the female joint section in accordance with the invention;

FIGURE 5 is a view taken in vertical longitudinal section upon a somewhat enlarged scale substantially upon the plane indicated by the section line 5—5 of FIGURE 4 with the attachment of the power source to the tool being shown in phantom therein;

FIGURE 6 is an end elevational view of the facing portion of the cutting head and element of the tool;

FIGURE 7 is an exploded perspective view of the tool of FIGURES 4 and 5; and

FIGURE 8 is a perspective view of a drill collar or other tool joint showing the two joint sections with their annular mating surfaces which are adapted to be refaced and refinished in accordance with this invention.

Reference is made first to FIGURE 8 wherein there is shown a tool joint consisting of a pair of cylindrical tool joint sections of uniform external diameter indicated by the numerals 10 and 12 the former comprising a male joint section and the latter a female joint section. As it will be noted, the section 10 has an externally tapered diametrically reduced threaded extremity as at 14 which is adapted to be received within the tapered internally threaded recess 16 of the other section. At the junction of the threaded extremity 14 with the body of the section 10, there is an annular surface 18 which is complementary to and mates with the annular surface 20 at the extremity of the section 12. When the tool joint is assembled, the two sections are screwed together until the mating surfaces 18 and 20 are in engagement. However, when unavoidable wear occurs between the interengaging threads 14 and 16, the mating surfaces 18 and 20 will engage before there is sufficient tightness in the threaded engagements to securely lock the joint sections together.

Heretofore when this condition occurred, it was the customary practice to remove the tool joints from their associated tool string, drilling string or pipe string depending upon the environment in which the joints were used, mount them in a lathe or other machine, rotate the joints and with this rotation refinish the surfaces 18 and 20 to the requisite precise dimensions to again establish a mating engagement of the surfaces 18 and 20 after the threaded portions 14 and 16 are again tightly engaged. This obviously is a time consuming and laborious operation, necessitating the removal of the sections from the string in which they are used, transporting them to a location having the requisite facilities for handling the joints during their refinishing and then returning them to use in the original intended environment. It is the purpose of this invention to refinish the annular mating surfaces of tool joints in a manner to obtain and restore the desired precision fit between the tool joint sections and this without the necessity for the removing of the joints from their location of use to a machine shop or the like, or without necessity of rotating the joint sections during the refinishing operation.

Although the term tool joint is used throughout this specification, it is to be understood that the term is intended to cover any threaded engagement of the joints whether a tool string, drilling string, a pipe line or the like, and wherein the threaded extremities of a joint section are provided with annular mating surfaces acting as a stop or limit to the rotational engagement of the joint sections.

Referring first to the form of the apparatus shown in

FIGURES 1-3, and which specifically is designed for the purpose of refinishing the annular mating surface of the tool joint section 10, it will be observed there is provided a mounting body 30 in the form of a cylindrical cap having internal threads 32 at one extremity which are adapted to engage upon the external threads 14 of the tool joint section 10. As shown best in FIGURE 2, the body 30 has an end wall 34 at its extremity in which is provided openings 36 for the reception of suitable tools by which the body may be threaded upon the joint threads 14. An axial bore 38 is disposed centrally through the end wall 34 of this body and is provided with a diametrically enlarged socket or recess 40 in which is disposed a suitable form of bearing 42 by which a shaft or arbor 44 is rotatably received in this body and is slidable therethrough and into the interior of the joint section 10.

It is to be understood that the shaft 44 may be readily removed from or inserted through the bearing 42 and bore 38 of the body 30.

Fixedly secured on the shaft 44 at what may be termed its outer extremity as by welding or the like as at 46 is the end wall closure 48 of a cylindrical carrier indicated generally by the numeral 50. It will be appreciated that although the end wall 48 is shown as a closed circular wall, obviously other arrangements such as a spider or the like may be utilized it being merely necessary that this member shall provide the means for rigidly, sturdily and securely supporting the cylindrical carrier 50 upon the shaft 44 and in concentric relation thereto.

The carrier 50 is of greater diameter than that of the threaded extremity of the tool joint 10 and as desired may also be of greater diameter than that of the tool joint itself. Intermediate its ends, this carrier is provided with a plurality of openings 52 in its cylindrical wall by means of which access may be had to the interior of the carrier for inspecting the operation of the cutting elements thereon and the like.

At its inward extremity, the cylindrical wall of the cutting head or carrier 50 is provided with a rigidly outwardly extending annular flange 54 having a flat annular face which is perpendicular to the axis of the tool joint and of the shaft 44. Removably secured to the flat face of the flange 54 is an annular plate 56 to which a cutting element in the form of an annular member 58 is compressively clamped as by an annular ring 60 in a removable manner and as through the agency of the fastening bolts 62 threaded into the flange 54. It will be particularly noted that the ring 60 engages only the peripheral portion of the annular member 58 and clears the cylindrical exterior surface of the joint section 10 so as to not impede the axial movement of the devices towards the annular surface 18 of the joint section which is to be finished.

The annular member 58 comprises a cutting element which can be of various different characters. It is preferred, however, in the interest of precision of the refinishing operation and of readily replacement and renewal of the cutting element as may be necessary from time to time, to form this cutting element as a suitable disc of pliable material covered with a suitable abrasive. Obviously, however, other cutting elements may be utilized in accordance with this invention if desired.

As will be appreciated, it is necessary that some means be provided to prevent the excessive cutting of material from the annular mating surface 18. For this purpose a series of interchangeable spacer sleeves constituting stop means and indicated by the numeral 64 are employed. These spacer sleeves will be each of a precisely determined length in accordance with the amount of material which is desired to be moved from the surface 18. The sleeves will loosely surround the shaft 44 between the body 30 and the cutting head end wall 48 so as to act as a positive stop to limit further inward movement of the cutting head.

In operation, appropriate precise measurements will be taken of the worn tool joint and the precise amount of material to be removed from the annular mating surface 18 will thereupon be determined. The appropriate spacers 64 will then be chosen and placed upon the shaft 44 as shown in FIGURE 2. The body 30 will then be mounted upon the externally threaded portion of the tool joint and the shaft as threaded through the bearing member 42 will be precisely centered and journaled thereby. Thereupon, with the source of power applied to the shaft, the tool will be pushed towards the tool joint until the spacer prevents further inward movement. At that time, a selected amount of material will be removed from the joint and there will be thus produced a precisely finished or refinished surface 18.

Any desired means can be provided for supplying power to the shaft and thus rotating the cutting head. For this purpose, the conventional form of portable electric motor units indicated generally by the numeral 70 and having a socket member 72 adapted to engage the extremity of the shaft 44 may be utilized. The operation of the tool is clearly indicated in FIGURE 1.

Reference is now made to FIGURES 4-7 for an understanding of the construction of the tool for refinishing the annular surface 20 of the femal joint section 12. As in the preceding embodiment, there is provided a mounting body 74. This body has an axial bore 76 therethrough and has an externally threaded tapered surface 78 which is adapted to be threadedly engaged in the threads 16 of the joint section 12. The axial bore is provided with radially enlarged recesses each indicated by the numeral 80 at its opposite ends and bearing members 82 are received in these recesses for journaling the shaft 84 of the refacing tool. This shaft is readily slidable into and through the bearings and into the interior of the joint section 12 as indicated by the full and dotted lines in FIGURE 5.

Fixedly secured as by welding 86 to the shaft 84 adjacent its outer end is the cutting head of the tool. This consists of a circular plate 88 having a flat face opposed to that of the surface 20 and upon which flat face there is clamped a cutting element in the form of a disc or annular member 90 of the same character as the cutting element 58 of the preceding form. In a similar manner, a ring 92 compressively retains the peripheral portion of this cutting element or annular member against the face of the plate 88 as by means of the fastening bolts 94 threaded into the plate itself. Thus, the cutting element can be readily renewed or replaced as may be necessary.

It will be observed that the ring 92 is of sufficiently greater diameter than that of the joint 12 to permit the ring to pass about the exterior of the joint and thus permit the cutting element or member 90 to engage the surface 20 of the joint as indicated in dotted lines in FIGURE 5.

As in the preceding embodiment, the shaft extremity is provided with an internally threaded bore as at 96 for engagement and connection to a driving shaft which in turn is secured to the previously mentioned power means 70 and its driving socket 72. There is likewise provided a spacer 98 of the same construction and for the same purposes of the spacer 64 of the preceding embodiment.

The operation of the two forms of the invention are identical. The first form of FIGURES 1-3 is specifically adapted for refinishing the annular surfaces 18 of the male joint section while that of FIGURES 4-7 is specifically adapted to refinish the annular mating surface 20 of the female joint section. With the use of these two cutting heads and the necessary adaptor mounting bodies 30 and 74, the shaft of the cutting head may be appropriately centered with respect to the joint section to thus ensure a precision operation in the refinishing of the joint section.

It will be observed that in using this tool, it is not necessary to remove the joint section from the vicinity of its use nor is it necessary to mount the joint section for rotation. This greatly contributes towards the quickness and convenience by which a joint section may be refinished and restored to effective use.

The foregoing is considered as illustrative only of the principles of the invention. Further, since numerous modifications and changes will readily occur to those skilled in the art, it is not desired to limit the invention to the exatct construction and operation shown and described, and accordingly, all suitable modifications and equivalents may be resorted to, falling within the scope of the invention as claimed.

What is claimed as new is as follows:

1. A facing tool for working mating annular surfaces of drill collars, tool joints and the like comprising a support body having a shaft bearing therein, mounting means for threadedly attaching said body to a joint section in fixed rigid position thereon, a shaft rotatably journaled in said bearing and freely movable into a joint section to which said body is attached, a cutting head fixedly secured to said shaft for rotation therewith, a cutting element secured to said head and of such size as to cooperatively engage with the annular mating surface of an associated tool joint for dressing said surface, means for rotating said shaft, a stop means cooperating with said cutting element and body and limiting movement of said cutting element toward said annular surface.

2. The combination of claim 1 wherein said stop means engages both said head and body for limiting movement of said shaft and cutting element towards said annular surface.

3. The combination of claim 1 wherein said stop means comprises a spacer sleeve embracing said shaft and disposed between said head and body for limiting movement of said cutting element towards said annular surface.

4. The combination of claim 1 wherein said head includes an annular flat face adjacent its periphery, said cutting element comprising an annular member having an abrasive material thereon in opposed relation to said annular surface, means detachably securing said annular member to said flat face.

5. The combination of claim 4 wherein said detachable securing means comprises a ring engaging the perimeter of said annular member and fasteners engaging said ring and head and compressively retaining said annular member on said flat face.

6. The combination of claim 1 wherein said body comprises a cap internally threaded for engaging the external threads of the male section of a joint.

7. The combination of claim 1 wherein said head comprises a hollow cylindrical carrier with an open end, a flange on said carrier at its open end to which said cutting element is secured, means for rigidly connecting the other end of said carrier to said shaft.

8. The combination of claim 7 wherein said carrier includes openings in its cylindrical side wall.

9. The combination of claim 1 wherein said head comprises a hollow cylindrical carrier with an open end, a flange on said carrier at its open end to which said cutting element is secured, means for rigidly connecting the other end of said carrier to said shaft and a backing plate mounted on said flange and projecting radially inwardly of said carrier, said cutting element comprising an annular member, a ring clamping said annular member for said plate and the latter to said flange.

10. The combination of claim 1 wherein said body comprises an externally threaded plug for engaging the internal threads of the female section of a joint.

11. The combination of claim 1 wherein said body comprises an externally threaded plug for engaging the internal threads of the female section of a joint, said plug having a bore therethrough and a pair of bearings disposed in said bore and journaling said shaft.

12. The combination of claim 1 wherein said head comprises a plate having a flat face, said cutting element comprising an annular member, a ring compressively clamping said annular member to said plate, said plate member and ring being of greater diameter than said female section.

References Cited in the file of this patent

UNITED STATES PATENTS

| | | |
|---|---|---|
| 460,380 | McGarvey | Sept. 29, 1891 |
| 692,459 | Langlois | Feb. 4, 1902 |
| 1,334,224 | Campbell | Mar. 16, 1920 |
| 2,180,640 | Mikalson | Nov. 21, 1939 |
| 2,460,985 | Jackson | Feb. 8, 1949 |
| 2,491,565 | Johnson | Dec. 20, 1949 |
| 2,528,474 | Moore | Oct. 31, 1950 |
| 2,587,398 | Smith | Feb. 26, 1952 |
| 2,663,227 | Licciardello | Dec. 22, 1953 |
| 2,713,339 | Sayers | July 19, 1955 |
| 2,802,319 | Hume | Aug. 13, 1957 |
| 2,807,918 | Rupp | Oct. 1, 1957 |
| 2,878,626 | Elliott | Mar. 24, 1959 |